(12) United States Patent
King et al.

(10) Patent No.: US 8,134,372 B2
(45) Date of Patent: Mar. 13, 2012

(54) PRESSURE TANK FAULT DETECTOR AND METHOD

(76) Inventors: Kegan Y. King, Greenville, MI (US); James S. Watson, Austin, TX (US)

( * ) Notice: Subject to any disclaimer, the term of this patent is extended or adjusted under 35 U.S.C. 154(b) by 712 days.

(21) Appl. No.: 12/262,788

(22) Filed: Oct. 31, 2008

(65) Prior Publication Data

US 2009/0115424 A1 May 7, 2009

Related U.S. Application Data

(60) Provisional application No. 60/984,849, filed on Nov. 2, 2007.

(51) Int. Cl.
*G01R 31/14* (2006.01)
*F04B 49/06* (2006.01)

(52) U.S. Cl. ................... 324/511; 417/44.1

(58) Field of Classification Search ............ 324/511
See application file for complete search history.

(56) References Cited

U.S. PATENT DOCUMENTS

| | | | |
|---|---|---|---|
| 4,341,178 A | 7/1982 | Price | |
| 4,799,864 A | 1/1989 | Hockley | |
| 4,864,287 A | 9/1989 | Kierstead | |
| 4,998,097 A | 3/1991 | Noth et al. | |
| 5,076,763 A * | 12/1991 | Anastos et al. | ............ 417/44.11 |
| 5,205,316 A | 4/1993 | Pruett | |
| 5,237,310 A | 8/1993 | Smith | |
| 5,461,906 A | 10/1995 | Bogle et al. | |
| 5,577,890 A | 11/1996 | Nielsen et al. | |
| 5,627,713 A | 5/1997 | Takeshi | |
| 5,651,350 A * | 7/1997 | Blomquist et al. | ............ 123/520 |
| 5,868,280 A | 2/1999 | Schroeder | |
| 6,530,265 B2 * | 3/2003 | Dawson et al. | ................ 73/49.7 |
| 6,802,084 B2 | 10/2004 | Ghertner et al. | |
| 7,418,856 B2 * | 9/2008 | Kohler | ............ 73/49.7 |

FOREIGN PATENT DOCUMENTS

| | | |
|---|---|---|
| JP | 08-086278 A | 4/1996 |
| KR | 20-0299553 Y1 | 12/2002 |
| KR | 20-0311801 Y1 | 5/2003 |

(Continued)

OTHER PUBLICATIONS

SymCom Inc. brochure regarding Models 77C and 77C-LR overload relays, published Jan. 2006 (2 pages).

(Continued)

*Primary Examiner* — Jeff Natalini
(74) *Attorney, Agent, or Firm* — Gardner, Linn, Burkhart & Flory, LLP (57) ABSTRACT

A pressure tank fault detector and method provides a system for detecting a fault in a pressure tank, such as a well water tank. The system includes a current transformer positioned adjacent a pump power wire. A circuit includes a timer, a data recorder, and a system status indicator. When the pump operates, the current transformer sends a signal to the circuit and the timer measures the signal duration. The data recorder logs a short cycle when the timer measures less than a selectable predetermined amount of time. When two or more short cycles are recorded, a signal indicates that a tank fault has been detected. Preferably, the system includes a test circuit and permits a user to select the number of short cycles before the alarm and whether to record only consecutive short cycles. Optionally, the system detects and signals pump cycles that exceed a predetermined excessive run time.

46 Claims, 9 Drawing Sheets

FOREIGN PATENT DOCUMENTS

WO  98-54560 A1  12/1998

OTHER PUBLICATIONS

SymCom Inc. document entitled "Installation Instructions for SymCom's Model 77C Electronic Overload Relay," published Apr. 2003 (11 pages).

SymCom Inc. brochure regarding Models 232-Insider and 112-Insider, published Jan. 2006 (2 pages).

SymCom Inc. brochure regarding Models 231-Insider and 111-Insider, published Jun. 2004 (2 pages).

SymCom Inc. brochure regarding Models 233 and 111, published Jun. 2004 (2 pages).

SymCom Inc. brochure regarding Model 520CS, published Jun. 2004 (2 pages).

Owner's Manual for Franklin Electric Pumptec, Model No. 5800020600, published Feb. 2006 (8 pages).

Installation and Operating Instructions for Franklin Electric Pumptec-Plus, published Feb. 2007 (8 pages).

Brochure entitled "The Best Way to Protect a Submersible Motor and Pump," published by Franklin Electric, Jul. 2003 (2 pages).

Internet Website page entitled "Coyote Pump Protectors protect pumps and motors. Coyote Manufacturing, Inc.," for "Mini Coyote", available at http://www.coyotemfg.com/, published on or before Aug. 16, 2007.

Internet Website entitled "Coyote Pump Protectors protect pumps and motors. Coyote Manufacturing, Inc.," for "Basic Coyotes", available at http://www.coyotemfg.com/, published on or before Aug. 16, 2007 (2 pages).

Internet Website entitled "Coyote Pump Protectors protect pumps and motors. Coyote Manufacturing, Inc.," for "Super Coyotes", available at http://www.coyotemfg.com/, published on or before Aug. 16, 2007 (2 pages).

Internet Website entitled "Coyote Pump Protectors protect pumps and motors. Coyote Manufacturing, Inc.," for "High Horsepower Coyotes", available at http://www.coyotemfg.com/, published on or before Aug. 16, 2007 (3 pages).

Installation and Operation Instructions for 4" Submersible Pumps, by Red Jacket Water Products, Published in 2001 (17 pages).

Internet Website entitled "Cycle Sensor", available at http://www.pumpsandtanks.com/cycle_sensor.htm, published on or before Oct. 30, 2007 (4 pages).

Search Report and Written Opinion by Korean Searching Authority for corresponding PCT Application U.S. Appl. No. PCT/US2008/082023, mailed Jun. 25, 2009.

* cited by examiner

PRESSURE TANK FAULT DETECTOR AND METHOD

CROSS REFERENCE TO RELATED APPLICATION

The present invention claims the benefit of U.S. provisional application Ser. No. 60/984,849, filed Nov. 2, 2007, which is hereby incorporated herein by reference in its entirety.

FIELD OF THE INVENTION

The present invention relates in general to pressure tanks, and, more particularly, to fault detectors for fluid pressure tanks.

BACKGROUND OF THE INVENTION

Pressure tanks are typically filled with fluid by a pump that pressurizes the fluid and directs it into the tank. A pressure switch monitors the fluid pressure in the tank and turns the pump on when a threshold minimum pressure is reached. The switch turns the pump off when a threshold maximum pressure is reached. For example, a well water pressure tank may be used to maintain pressure in the water system of a house without constantly cycling the pump on and off. The well water pressure tank is partially filled with water and maintains a head of air that remains in the tank as the water volume in the tank changes with water usage and pump operation.

SUMMARY OF THE INVENTION

The present invention provides a pressure tank fault detector that monitors the duration of pump run times or "cycles" to determine whether a possible fault, such as a leak, exists in the tank. The detector then generates a signal to warn a user that the pressure tank may be faulty and requires service or replacement.

In one form of the present invention, a fault detector system is provided for a pressure tank having a pressure-actuated switch for selectively energizing a pump. The system measures pump cycle times, wherein a normal cycle occurs when the pump is energized for at least a predetermined amount of time and a short cycle occurs when the pump is energized for less than the predetermined amount of time. The fault detector system includes a current transformer and an electrical circuit with a timer, a data recorder, and a system status indicator. The current transformer is positioned so as to be affected by the electromagnetic field of at least one electrical conductor that is associated with the pump, and produces a signal in response to an electrical current flowing through the conductor. The electrical circuit receives the signal from the current transformer and the timer measures the time period during which electrical current flows through the electrical conductor. The data recorder records a short cycle when the timer measures the period as being less than the predetermined amount of time. The system status indicator is operable to indicate a fault when the data recorder records two or more short cycles.

In another form of the present invention, a method is provided for detecting a fault in a pressure tank. The method includes providing a pressure tank, a pump for pumping a fluid into the pressure tank, and a pressure-actuated switch for energizing the pump. At least one electrical conductor is provided for energizing the pump via the switch. A current transformer and an electrical circuit having a timer, a data recorder, and a system status indicator are also provided. The current transformer is positioned so as to be affected by the electromagnetic field of at least one of the electrical conductors. A signal is produced at the current transformer in response to current flowing through at least one of the electrical conductors. The duration of the signal is measured with the timer and a short cycle is recorded with the data recorder when the timer measures the signal duration as being less than a predetermined amount of time. A fault is indicated at the system status indicator when the data recorder records two or more short cycles.

According to one aspect, the system status indicator is operable to indicate a fault only when the data recorder records three short cycles, or four or more short cycles. Optionally, the system status indicator may be operable to indicate a fault only when the data recorder records two, or three, or four or more consecutive short cycles. A switch may be provided to choose between recording all short cycles, or only consecutive short cycles. At least one selectable resistor may be provided at the electrical circuit for setting the number of short cycles the data recorder records before indicating a fault at the system status indicator. Another switch may be provided for selecting the number of short cycles that the data recorder records before a fault is indicated at the system status indicator.

According to another aspect, the data recorder records a short cycle when the timer measures the period as being less than about 99% of the predetermined amount of time. Optionally, the data recorder records a short cycle when the timer measures the period as being less than about 75%, or less than about 50%, or less than about 25% of the predetermined amount of time.

In yet another aspect, the electrical circuit includes a test circuit that interrupts the signal produced by the current transformer at least one time while the electrical current is flowing through the electrical conductor to simulate the signal produced during a short cycle. The system may include a visual indicator to indicate the status of the test circuit.

In still other aspects, the system status indicator is operable to indicated a status of the fault detector, and/or to indicate a status of the pump. The system status indicator may include a light, an audible alarm, and/or a remote signal unit.

In a further aspect, the current transformer is a loop transformer. The loop transformer may have a passageway for receiving the electrical conductor.

In another aspect, the electrical circuit is supported at a printed circuit board. The timer, the data recorder, and the system status indicator may also be supported at the printed circuit board. The electrical circuit may include a processor for controlling the timer, the data recorder, and the system status indicator. A reset switch may be provided for erasing data from the data recorder. Further, a transformer rectifier may be provided to supply low voltage current to the electrical circuit.

According to another aspect, the system detects excessively long pump cycles when the pump is energized for a time period of at least a predetermined excessive amount of time. A timer measures a long cycle when the timer measures a pump run time of more than the predetermined excessive amount of time. The system status indicator indicates a fault when the timer detects one or more of the long cycles.

In yet another aspect, the system is adapted to monitor a well water tank. Optionally, the system operates without interrupting the pump.

Therefore, the present invention provides a pressure tank fault detector that monitors pump run time to provide early detection of a fault in a pressure tank. The system prevents or reduces false alarms by waiting for at least two short cycles before triggering an alarm, and is capable of recording non-consecutive short cycles. The system may be customized for a particular pressure tank and pump application by setting or resetting the threshold time, below which a short cycle is detected. The system is easily installed at a well tank, for example, such as by placing a current transformer adjacent or around an electrical conductor of a pressure switch, and may be powered by a transformer rectifier or the like.

These and other objects, advantages, purposes, and features of the present invention will become apparent upon review of the specification in conjunction with the drawings.

DESCRIPTION OF THE PREFERRED EMBODIMENTS

Referring now to the drawings and the illustrative embodiments depicted therein, a pressure tank fault detector system 10 is provided for detecting a leak or other fault in a pressure vessel or pressure tank, such as a well tank 12 in a well water system 14. It will be appreciated that although embodiments are described with reference to well water system 14 (FIG. 1), pressure tank fault detector system 10 is applicable to any pressurized vessel or pressure tank that is pressurized with an electric pump or an electrically triggered pump.

Figure 1:
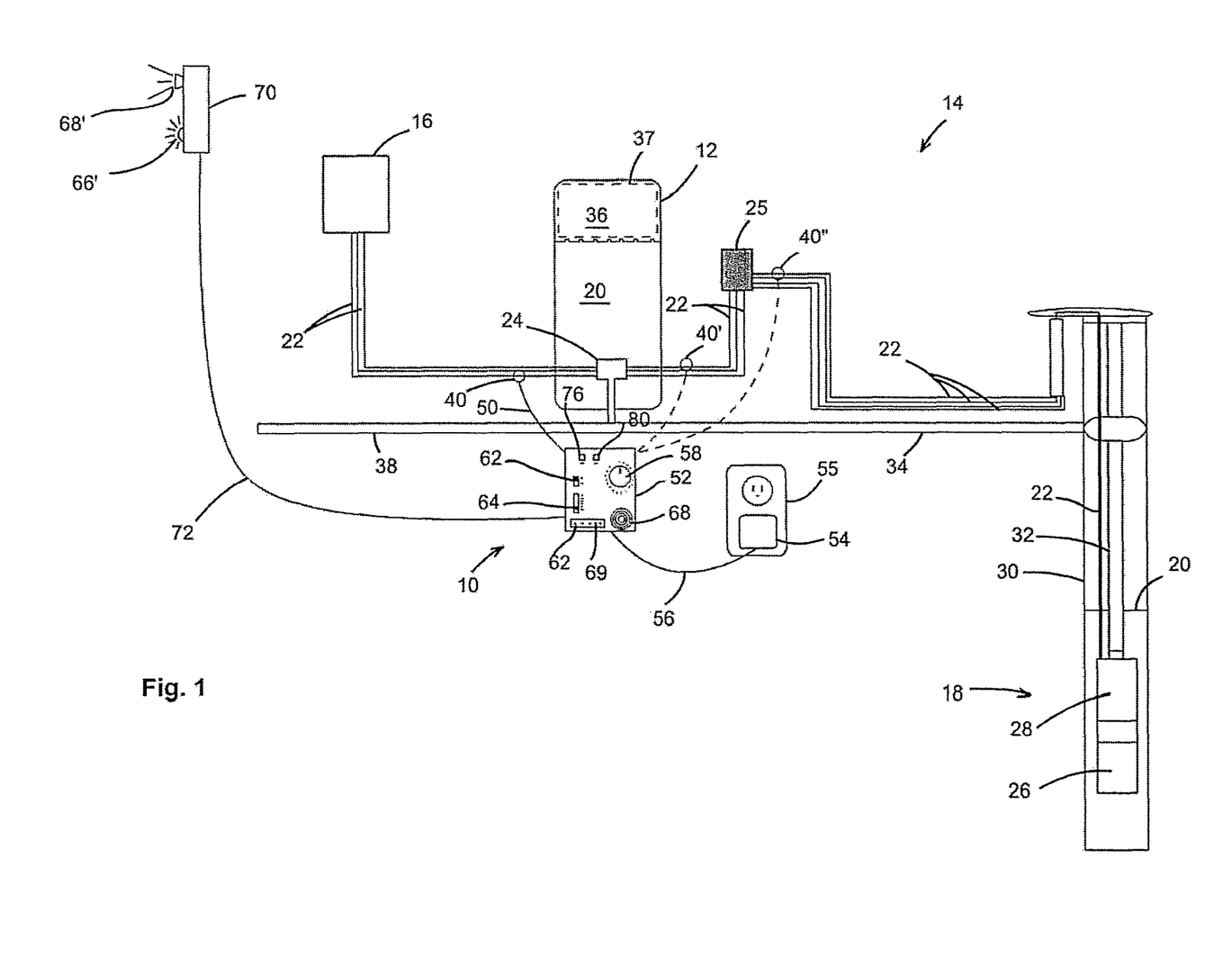
FIG. 1 is a diagram of a pressure tank fault detector in accordance with the present invention, with additional current transformers shown in phantom.
Figure 2:
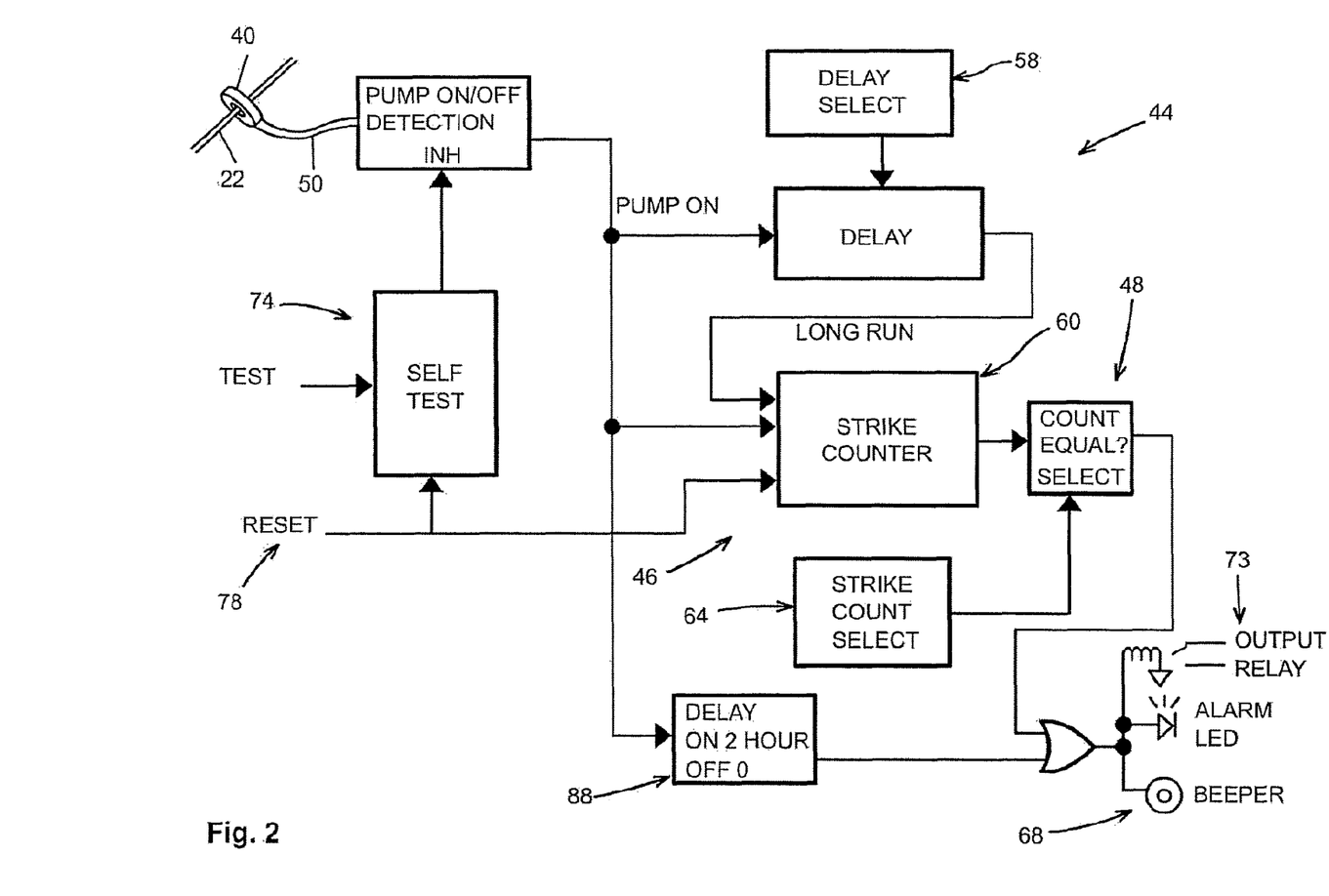
FIG. 2 is a block diagram of the pressure fault tank detector of FIG. 1.

Referring to FIG. 1, well water system 14 includes well tank 12 and a circuit breaker box or a power supply 16 for energizing a pump 18 that pumps water 20 into tank 12. Power supply 16 is electrically coupled to pump 18 via a plurality of electrical conductors or wires 22 that pass through a pressure switch 24 and a control box or fuse box 25. Such a pressure switch is available, for example, from Square D, a brand, of Schneider Electric of Paris, France. Power supply 16 may typically supply single-phase or three-phase current to motor 28 via wires 22 and pressure switch 24, and may supply current at a voltage of 110V, 220V, or 440V, for example. Pump 18 includes a pump unit 26 and an electric motor 28 to drive pump unit 26 when motor 28 is energized via wires 22. Pump 18 is immersed in a well 30 and is in fluid communication with well tank 12 via a drop pipe 32 and a water line 34.

Well tank 12 includes an air space or head 36 that contains pressurized air above water 20. Optionally, head 36 may be contained in an inflatable, expandable, or flexible bladder 37 to separate head 36 from water 20 and prevent air in head 36 from dissolving into water 20. Well tank 24 receives pressurized water 20 from pump 18 via drop pipe 32 and water line 34, and discharges pressurized water 20 into a discharge pipe 38 on demand, such as when a faucet is opened.

Pressure switch 24 includes a pressure transducer (not shown) that detects the fluid pressure in well tank 12. Pressure switch 24 is configured to open an electrical connection at switch 24 to turn off pump 18 when pump 18 is operating and the pressure of water 20 in well tank 12 has reached a threshold high value, such as about 50 to 65 psi. Pressure switch 24 is configured to close the electrical connection at switch 24 to energize pump 18 when the pressure of water 20 in well tank 12 has dropped to a threshold low value, such as about 30 psi.

During normal operation of well water system 14, the mass or amount of air in head 36 remains constant as the head's pressure and volume change inversely proportionally to one another. For example, in a system having a well tank designed to receive and discharge twenty gallons of water, and a pump that pumps twenty gallons of water per minute (gpm), a normal pump cycle is about sixty seconds (1 minute×20 gpm=20 gallons). However, if the tank were to become faulty and lose air from the head because of a leak, or because air slowly dissolves into the water and is subsequently lost through the water system, a "short cycle" or "short cycling" of the pump would occur. This is because when air is lost from the head, the head pressure drops for a given volume of air, and the pressure switch detects the low pressure threshold when less than twenty gallons of water are drained from the tank. Therefore, the pump will turn on before twenty gallons have been discharged from the tank and less than twenty gallons of water will have been pumped into the tank when the pressure switch detects its high pressure threshold and turns off the pump.

Because the pump in this illustrative example always runs at about twenty gpm, the Pump's cycle time decreases to less than one minute per cycle. If half of the air is lost from the faulty tank, for example, then only about 10 gallons of water will be drained from the tank before the pump is energized, and the pump runs for about 30 seconds to pump 10 gallons back into the tank before the high pressure threshold is again reached. In extreme cases, as when most or all of the air is, lost from the head of the well tank, the pump will turn on as soon as a water faucet is opened because the tank pressure immediately drops to zero. The pump will turn off almost immediately after the faucet is closed because the tank pressure immediately rises to the pump operating pressure (above the high pressure threshold of the pressure switch) when there is no compressible air in the tank. Thus, loss of air from the head leads to short cycles of the pump, which causes undue wear or failure of the pump and can lead to costly repairs.

Fault detector system 10 includes a current transformer 40 and an electrical circuit 42 (FIGS. 3 and 4A-D). Electrical circuit 42 includes a timer 44, a data recorder 46, and a system status indicator 48. Current transformer 40 is placed adjacent or around one of wires 22 that supplies electricity to pump 18, and generates or produces a signal in response to current flowing through wire 22. Current transformer 40 may be placed on or near any current-carrying wire 22 associated with the pump, such as between power supply 16 and pressure switch 24, between pressure switch 24 and fuse box 25 (at transformer 40'), or between fuse box 25 and motor 28 (at transformer 40"), so long as current transformer 40 is affected by the electromagnetic field of a current-carrying wire associated with motor 28. The signal is transmitted from current transformer 40 to electrical circuit 42 via a signal wire 50.

Timer 44 measures the duration of the signal and data recorder 46 records a short cycle if the duration of the signal is measured by timer 44 to be less than a predetermined amount of time. System status indicator 48 indicates a fault when data recorder 46 records two or more short cycles, as will be described in greater detail below. Fault detector system 10 is mounted in a housing 52 (FIG. 1) that may be mounted at or near well water system 14. A transformer rectifier or DC transformer 54 may be plugged into a conventional AC electrical outlet 55 to supply electrical power to electrical circuit 42 of fault detector system 10 via low voltage wires 56. For example, DC transformer 54 may transform standard 110V AC electrical power from AC outlet 55 to DC voltage in the range of about 9V to 20V DC, and in one preferred embodiment, about 12V DC. In the illustrated embodiment, DC transformer 54 delivers 12V DC to a power circuit 57 (FIGS. 3 and 4B) that includes a Zener diode 57a that allows a power LED to illuminate if the voltage in wires 56 is greater than 10V DC, and a 5V regulator 57b for supplying electrical power throughout circuit 42.

Current transformer 40 is preferably a loop or an annular ring with a passageway sized to receive one of wires 22 therethrough. Such a current transformer is available, for example, as part number 8401 from CR Magnetics, Inc. of St. Louis, Mo. However, it will be appreciated that any current transformer capable of generating a signal when current flows through a nearby electrical conductor may be used, such as a toroidal or square-shaped transformer. In a three-phase electrical system, current transformer 40 may be placed adjacent, near, or around one wire or two wires of the electrical system. Current transformer 40 produces an electrical signal when current flows through the wire. Preferably, the signal is an electrical signal carrying a current of less than about 0.05 amps at less than about 30 volts. The signal passes through signal wire 50, which may be a standard telephone cable, and connects to electrical circuit 42 via a jack, such as a RJ-11 jack or the like. Signal wire 50 may be of substantially any length and routed to circuit 42 such that fault detector system 10 may be spaced from well water system 14.

Timer 44 measures the duration of the signal received from current transformer 40 when pressure switch 24 is closed and current flows through wires 22 to pump 18. In the illustrated embodiment, timer 44 includes an oscillator 44a (FIGS. 3 and 4A) for generating a constant-frequency timing signal output, such as a 4096 Hz output, which is received by a binary counter 44b that divides the constant-frequency timing signal output into other constant-frequency timing signal outputs for various uses, such as for timing a test-signal interruption (discussed below) or for timing alarm and LED signals, in addition to measuring the duration of the signal received from current transformer 40. Another binary counter 44c (FIGS. 3 and 4C) receives a timing signal from counter 44b and holds at its present count (i.e. elapsed time) when the signal received from current transformer 40 stops, in addition to providing other timing and signaling functions.

Figure 3:
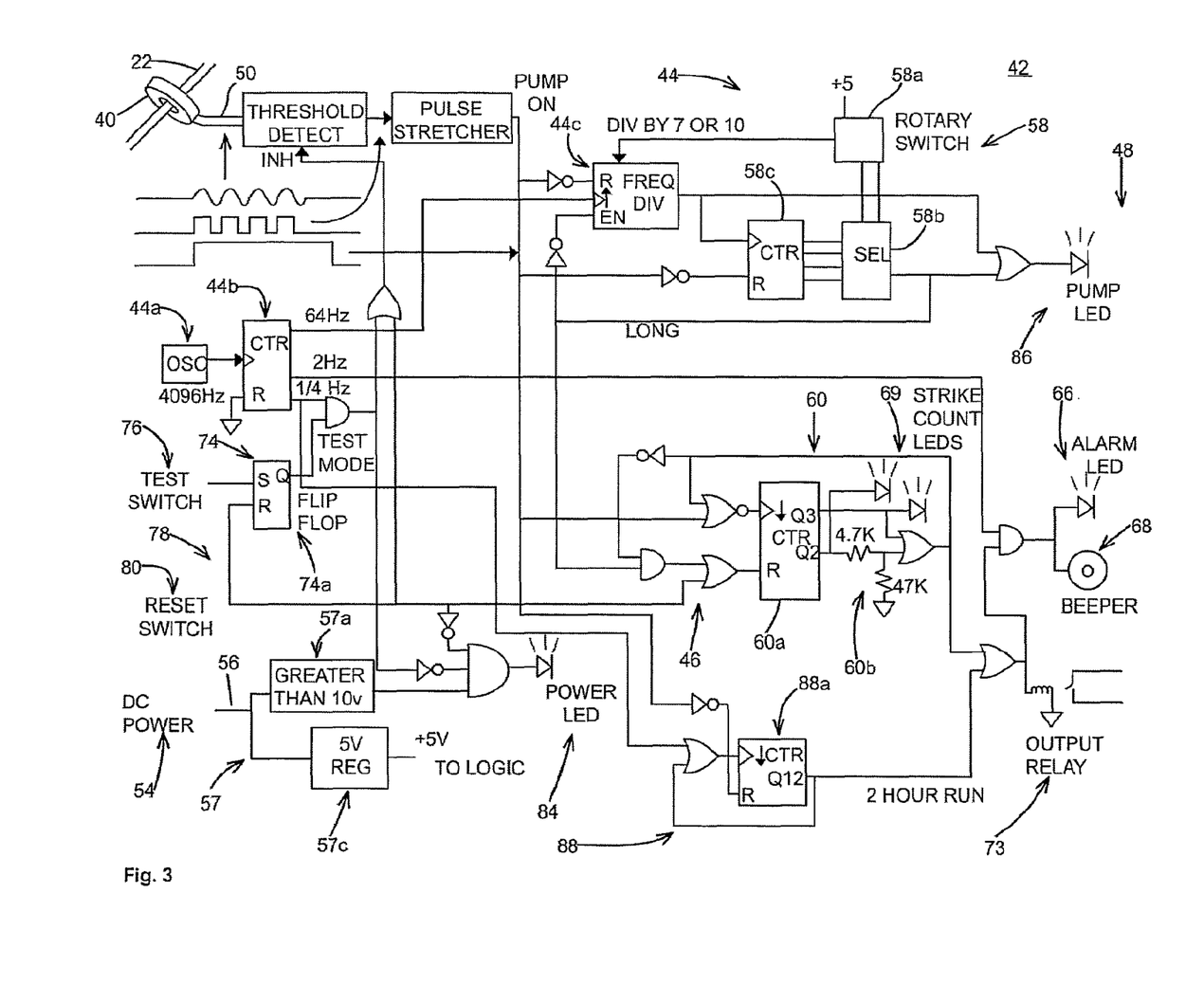
FIG. 3 is a simplified schematic diagram of the pressure tank fault detector.
Figure 4A:
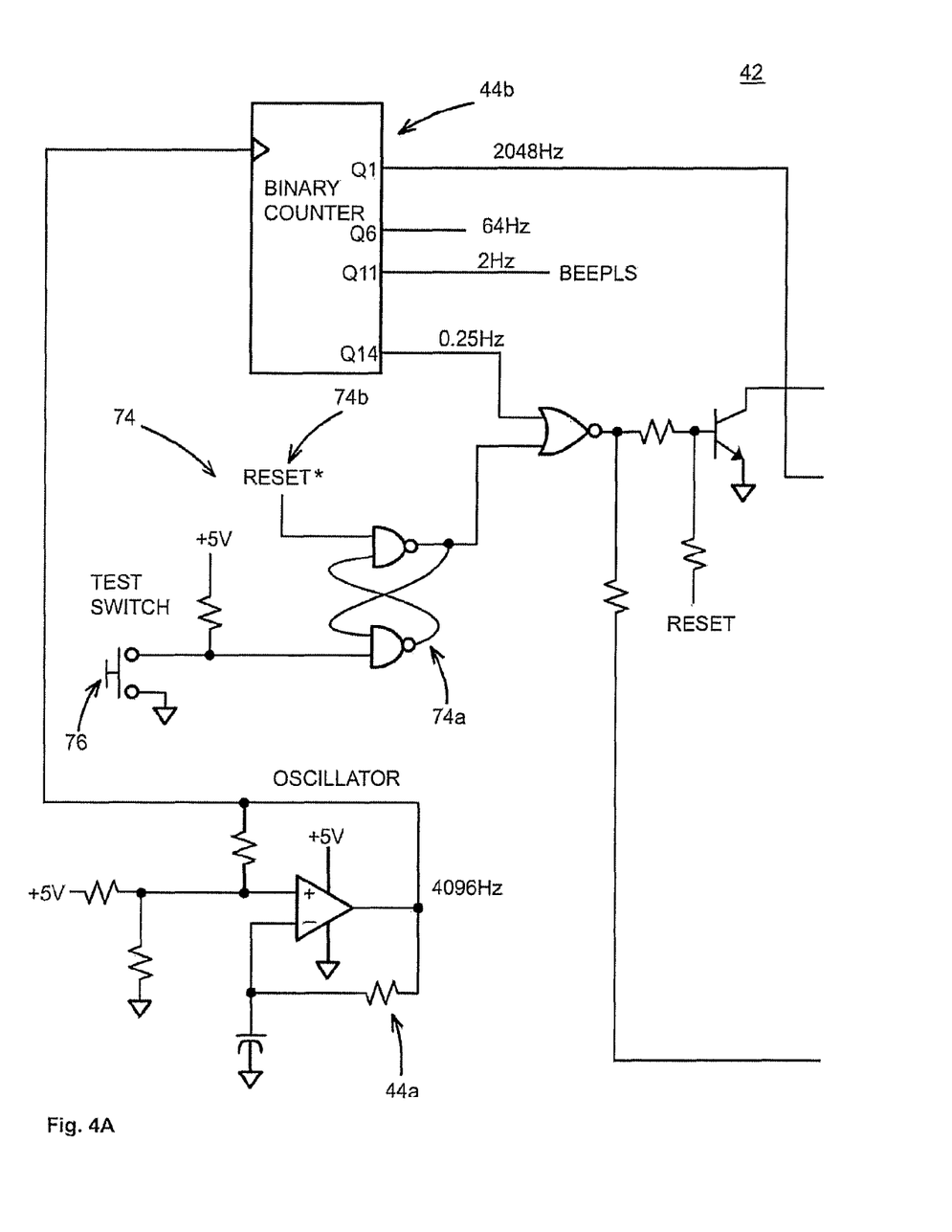
FIGS. 4A-D are a detailed schematic diagram of the pressure tank fault detector of FIG. 3.
Figure 4B:
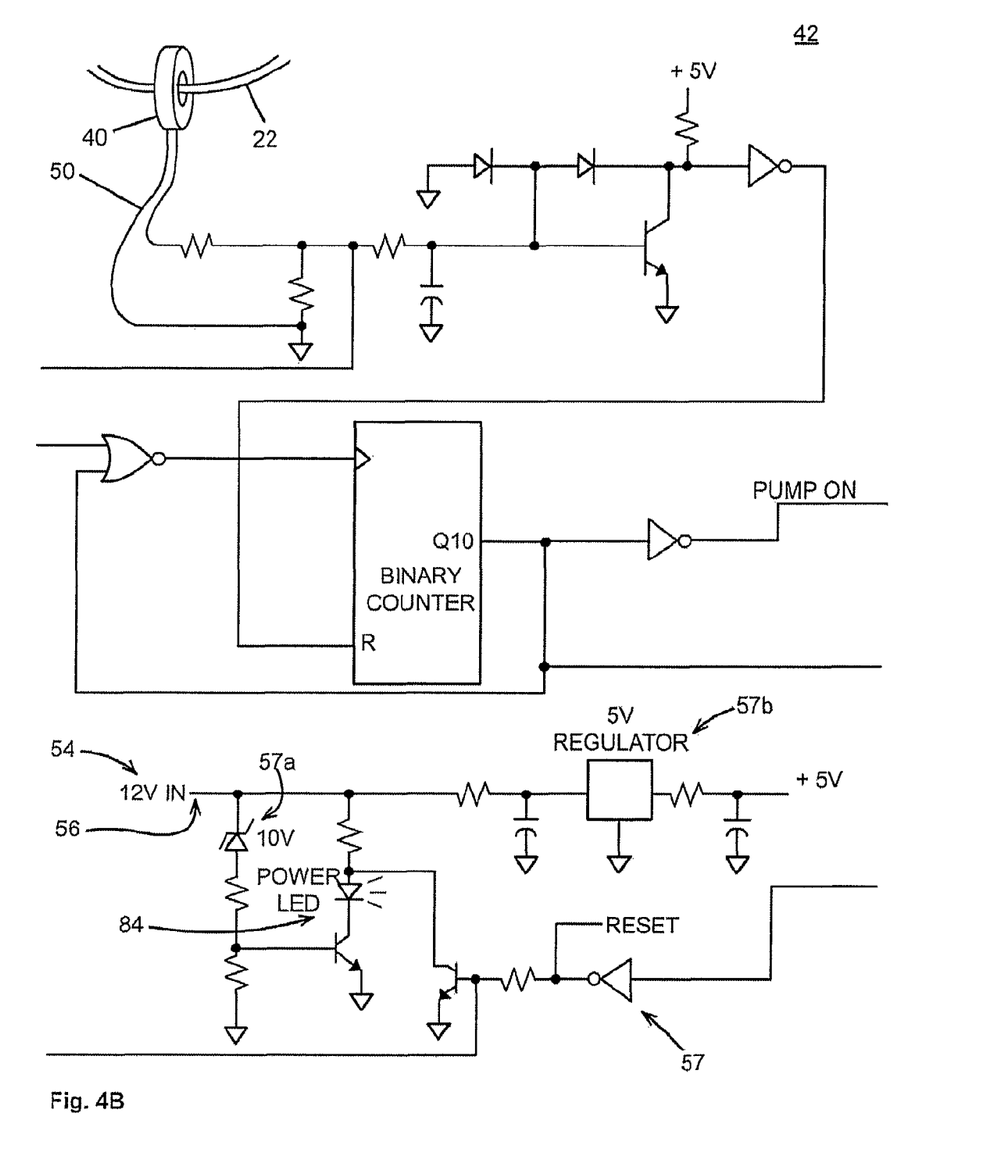
Figure 4C:
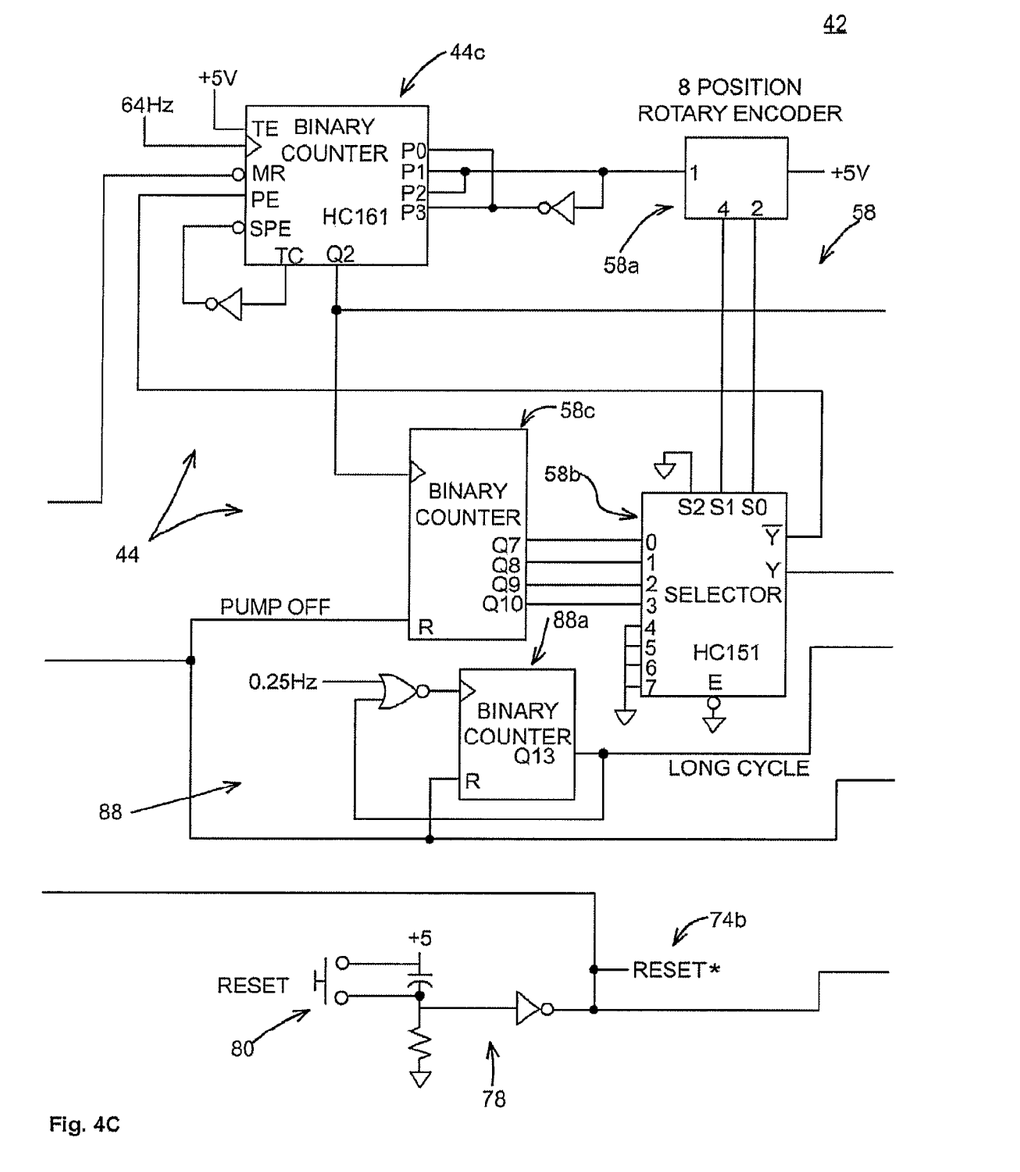

A time selector, 58 permits a user to select a predetermined time, such as between 2 seconds and 450 seconds, or between 7 seconds and 80 seconds, for example, below which a short cycle is considered to exist. For example, if well tank 12 normally discharges twenty gallons of water 20 before switch 24 energizes pump 18, and pump 18 pumps at a rate of twenty gpm (i.e., normal run time equals sixty seconds), time selector 58 may be set at sixty seconds so that a short cycle is detected for any pump run time of less than the predetermined time, i.e., the normal run time of sixty seconds. In the illustrated embodiment, time selector 58 includes an 8-position rotary encoder 58a that permits adjustment of the predetermined time by adjusting the frequency count at binary counter 44c, using a selector 58b and additional binary counter 58c (FIGS. 3 and 4C).

Preferably, time selector 58 is set at a Value somewhat less than the normal run time, such as 99% or less of the predetermined time, so that minor variations in the time period of pump run time are not considered short cycles by fault detector system 10. Time selector 58 may be set at any predetermined time less than the normal run time of pump 18, such as to detect when a fault in tank 12 has reached a degree that is unacceptable to the user. For example, the user may set time selector 58 so that the predetermined time is 75% or less of the normal run time, or 50% or less, or 25% or less, thereby permitting the user to be alerted that only a certain degree of a fault, in the form of air loss from head 36, has been reached.

Figure 4D:
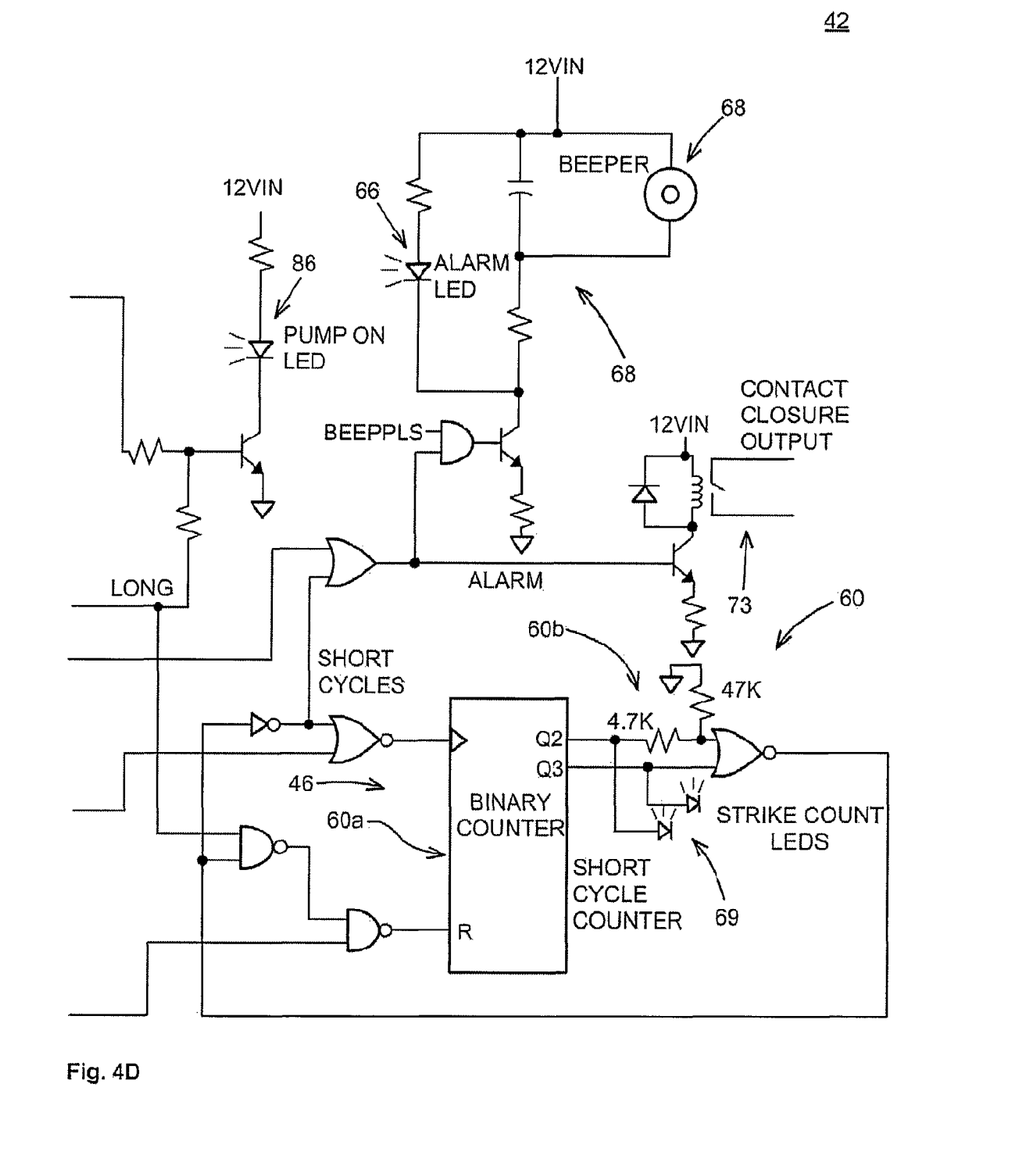
Figure 5:
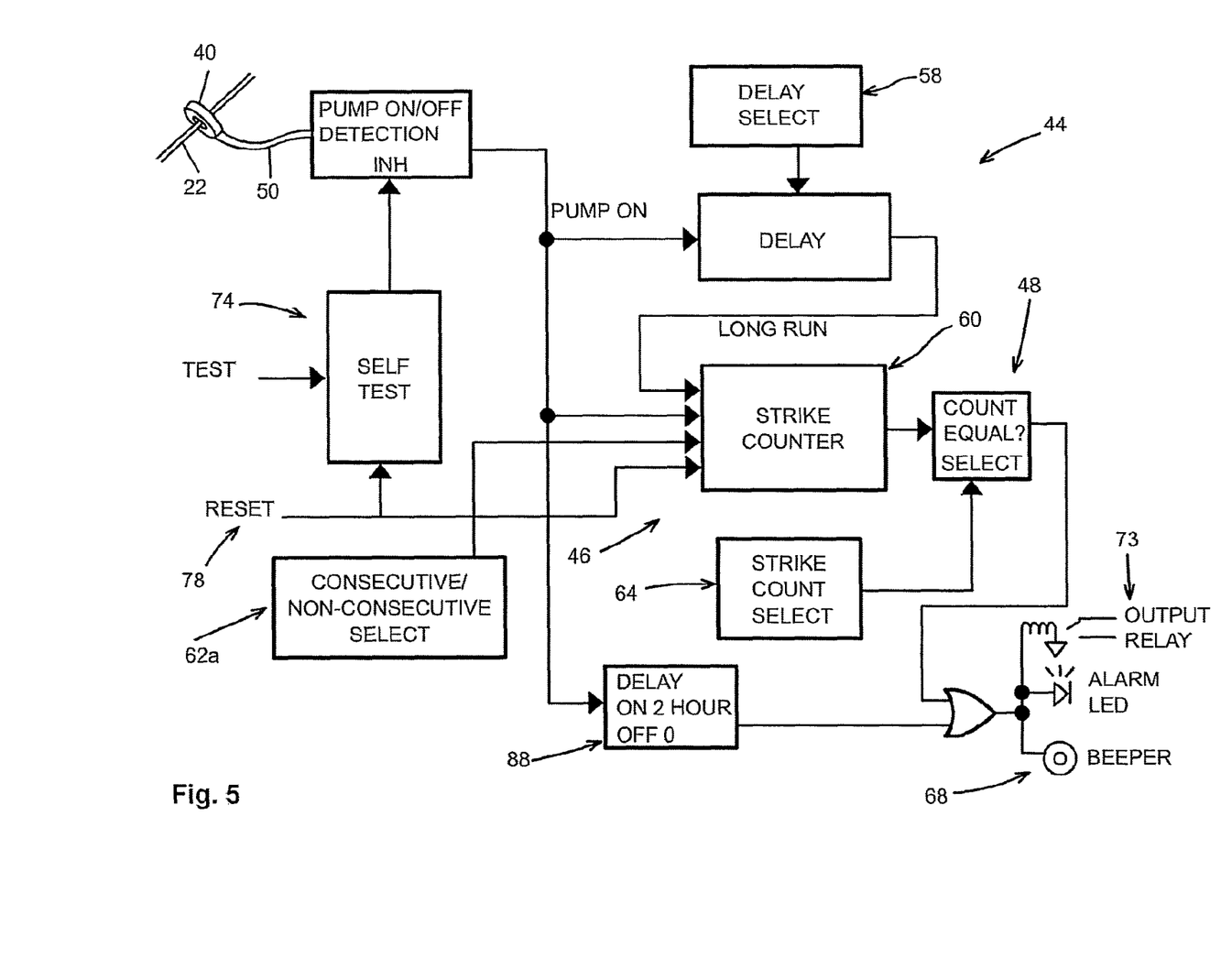
FIG. 5 is a block diagram of another pressure tank fault detector, including a consecutive/non-consecutive selection circuit.
Figure 6:
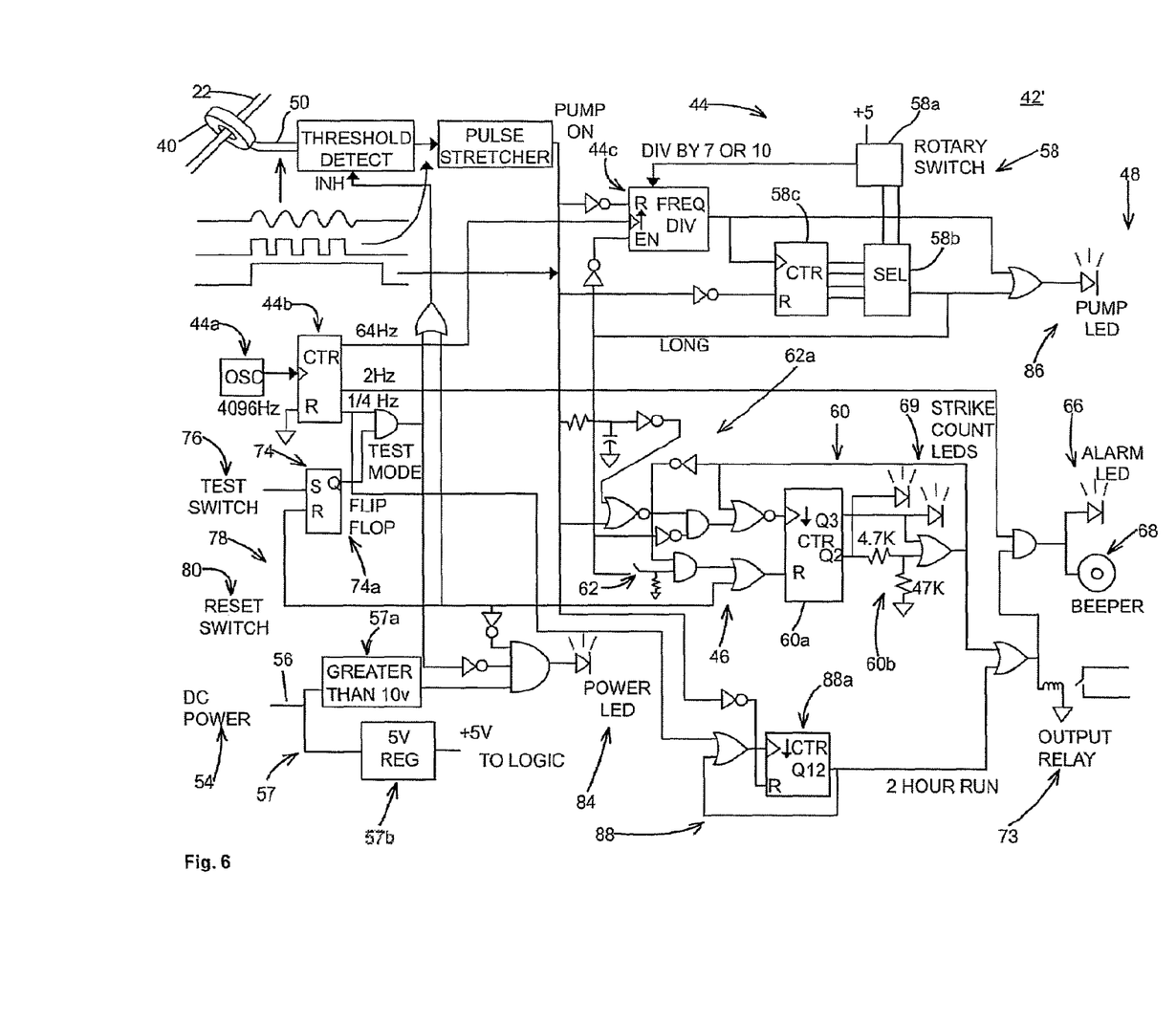
FIG. 6 is a schematic diagram of the pressure tank fault detector of FIG. 5.

Data recorder 46 includes a strike counter or short cycle logger 60 (FIGS. 2-4D) that records a short cycle or "strike" at each occurrence. Such a data recorder is available, for example, as a model HC4040 12-bit binary counter from SOS-Thompson Microelectronics, of Phoenix, Ariz. Optionally, a switch 62 and associated circuit 62a (FIGS. 1, 5, and 6) may be provided at an electrical circuit, such as optional circuit 42' (FIG. 6), and made accessible through housing 52 to permit the user to select between logging all short cycles and logging only consecutive short cycles. When switch 62 is set for consecutive short cycles, logger 60 records a first short cycle and then only records a second short cycle (or third, or fourth, etc.) if the second short cycle occurs immediately after the first short cycle. When switch 62 is set for consecutive short cycles, if a normal or non-short cycle is detected by timer 44 immediately after a first short cycle, the first short cycle is automatically erased from logger 60 of data recorder 46. When switch 62 is set for nonconsecutive short cycles, a record or log of a first short cycle remains at logger 60 indefinitely until fault detector system 10 is manually reset, as will be described in greater detail below. In the illustrated embodiment, short cycle logger 60 includes a binary counter 60a that stores one count for each detected short cycle and resets the count to zero when reset circuit 74 is activated or when circuit 42 is powered on (FIGS. 3 and 4D). Optionally, resistors 60b (such as selectable resistors) are included for controlling the number of short cycles that must be stored in binary counter 60a before an alarm signal is sent and counting short cycles is halted.

System status indicator 48 generates a perceptible signal or alarm to the user when short cycle logger 60 of data recorder 46 records two or more short cycles (either consecutive or nonconsecutive, depending on the position of switch 62). The number of short cycles recorded before system status indicator 48 generates the signal is determined via one or more selectable resistors at circuit 42. Optionally, or alternatively, a switch 64 may be connected to electrical circuit 42 and made accessible through housing 52 to permit the user to select the number of short cycles that will be logged or recorded at short cycle logger 60 of data recorder 46 before the signal is generated at system status indicator 48. Thus, switch 64 may be used to set indicator 48 to generate the signal only after two, three, or four or more short cycles are recorded.

System status indicator 48 generates the perceptible signal via a visual alarm, such as a blinking light-emitting diode (LED) 66, and/or an audible alarm, such as a speaker or beeper 68. Such a beeper or buzzer is available, for example, as a model DB-288 piezo buzzer from DB Products Limited, of Hong Kong. LED 66 and beeper 68 are activated by system status indicator 48 when logger 60 has recorded two short cycles or, optionally, when logger 60 has recorded the number of short cycles selected by the user at switch 64. Optionally, one or more lights or LEDs 69 may be provided at housing 52 to indicate the number of short cycles that have been logged at logger 60 since the last reset.

A remote signal unit 70 may be connected to system status indicator 48 to generate a perceptible signal via a visual alarm and/or an audible alarm, such as with LED 66' and beeper 68'.

Remote signal unit 70 may be connected to system status indicator 48 by a conductor or wire 72 and placed in a convenient location where the alarm is more easily noticed by the user. Alternatively, remote signal unit 70 may receive a wireless signal from the system status indicator. Optionally, the system status indicator may send the signal wirelessly or via a wire or fiber optic cable to a computer terminal, a monitoring station, a telephone or cellular phone or the like, without departing from the spirit and scope of the present invention. An output relay 73 (FIGS. 2, 3, and 4D) may be provided for sending alarm signals to remote locations such as remote signal unit 70 or substantially any other remote display or alarm device.

A test circuit 74 (FIGS. 2, 3, and 4A) is provided at electrical circuit 42 to test the functionality of fault detector system 10. Test circuit 74 may be activated by depressing a test button 76 while pump 18 is running to initiate a test sequence. Test button 76 may be depressed when pump 18 is not running, but the test sequence will not be initiated until pump 18 is subsequently started. Test circuit 74 interrupts the signal that is produced by current transformer 40 when current flows through the wire 22 that is being monitored by transformer 40.

Test circuit 74 interrupts the signal at least one time, and preferably interrupts the signal repeatedly until the system is reset, such that less than the predetermined amount of time than is selected at time selector 58 elapses between each interruption. Preferably, to shorten the duration of the test, test circuit 74 interrupts the signal repeatedly within a short period of time, such as within ten seconds, or five seconds, or less. By interrupting the signal repeatedly, test circuit 74 simulates at least two short cycles, the first simulated short cycle occurring between the first and second interruptions, the second simulated short cycle occurring between the second and third interruptions, and so on. If short cycle logger 60 has already recorded one or more short cycles when test circuit 74 is activated, for example; then system status indicator 48 will generate its signal after only one or two interruptions of the signal from current transformer 40. In the illustrated embodiment, test circuit 74 includes a signal "flip-flop" 74a (FIG. 4A) for intermittently interrupting the signal until a reset signal 74b (FIGS. 4A and 4C) is received.

Thus, test circuit 74 tests the functionality of current transformer 40 by testing whether current transformer 40 is sending the signal via wire 50 to electrical circuit 42, and by testing whether timer 44 is measuring the duration of the cycle, whether data recorder 46 is properly recording short cycles, and whether system status indicator 48 is activating LED 66 and/or beeper 68, respectively, when two or more short cycles occur.

A reset circuit 78, activated by a switch or button 80 (FIGS. 2, 3, and 4C), is operable to erase the short cycles logged in short cycle logger 60 of data recorder 46. For example, reset circuit 78 may be used to erase short cycles recorded during a test by test circuit 74, to erase short cycles recorded during actual short cycles of pump 18, and/or to erase the record of one or more short cycles that are known to have been caused by an outside event such as a power failure that occurred during a cycle of pump 18 before the predetermined time set at time selector 58 had elapsed.

Electrical circuit 42 may be incorporated at a printed circuit board, or may be a conventionally wired circuit. Optionally, circuit 42 may include a battery backup to prevent the loss of records on short cycle-logger 60 during a-power failure, or if DC transformer 54 fails or is removed from AC outlet 55. The printed circuit board or circuit may include one or more power LEDs 84 and one or more motor LEDs 86 for indicating system status. Power LEDs 84 indicate power is being received from DC transformer 54, and may provide a solid green light, for example. Power LEDs 84 may provide a flashing green light, for example, to indicate the operation of the test mode by test circuit 74. Motor LEDs 86 may provide a flashing orange light, for example, to indicate that pump 18 is operating and has been operating for less than the predetermined amount of time selected at time selector 58. Motor LEDs 86 may also provide a solid orange light, for example, to indicate that pump 18 is operating and has been operating for more than the predetermined amount of time selected at time selector 58. In the illustrated embodiment, motor LEDs 86 are controlled by binary counter 44c.

Optionally, a processor may be implemented at an electrical circuit of the present invention to perform the functions of a timer, a data recorder, a reset circuit, and/or a test circuit, for example. Such a processor is available, for example, as model number COPS8 from National Semiconductor Corp. of Santa Clara, Calif.; model number HC11 from Motorola, Inc. of Schaumberg, Ill.; or model number 8031 from Intel Corp., of Santa Clara, Calif.

Accordingly, fault detector system 10 may be installed at well water system 14 to provide early warning of a fault in well tank 12 with a low chance of false alarms. Fault detector system 10 is easily installed by plugging DC transformer 54 into AC outlet 55 and placing current transformer 40 adjacent or around any of wires 22 supplying power from power supply 16 to motor 28 of pump 18. Fault detector system 10 may be set by the user to record any cycle of pump 18 that is less than the normal run time of the pump 18 coupled to the tank 12 (a short cycle), and to alert the user to a fault only after recording two or more short cycles.

When timer 44 detects a short cycle by pump 18, data recorder 46 records the short cycle at short cycle logger 60 and may illuminate strike count LED 69. When data recorder 46 has logged two or more short cycles, as selected at switch 64 (or two or more consecutive short cycles, as selected at switch 62), system status indicator 48 activates LED 66 and/or beeper 68 and/or remote signal unit 70 to warn the user that tank 12 is probably faulty and losing air. Reset circuit 78 may then be activated by the user to erase the records at logger 60, extinguish LEDs 66, 66', 69, and silence beepers 68, 68'. Preferably, fault detector system 10 will not interrupt pump 18 when a short cycle is detected, so that well water system 14 continues to provide water pressure even when tank 12 is faulty. Optionally, fault detector system 10 may interrupt pump 18 when a short cycle is detected, such as when a predetermined number of short cycles are detected, or when the short cycles are of a particularly short duration.

To test fault detector system 10, test circuit 74 is activated by pressing button 76, which repeatedly interrupts the signal from current transformer 40 when pump 18 is running to simulate two or more short cycles. The user is provided with an indication that system 10 is working properly when system status indicator produces an alarm via LED 66, 66' and/or beeper 68, 68'. System 10 may then be reset by activating reset circuit 78 with switch 80.

Fault detector system 10 may be used with any well water system having an electric pump, a pressure tank, and a pressure switch. System 10 may be used with any size pump, may be used whether the pump operates on single phase or three phase current at any voltage, and may be installed at the time well system 14 is installed or later as an aftermarket add-on. System 10 is resistant to false alarms caused by power outages or the like because it does not produce an alarm signal after detecting a single short cycle, although it could be modified to do so. Further, system 10 can be set to detect very early onset of a tank fault that could later lead to excessive pump wear and/or failure, and can be reset to detect only advanced stages of a tank fault.

Optionally, electrical circuit 42 may detect excessively long run times of pump 18, which may be indicative, of a dry well, a plugged water pipe, a sufficiently large water leak, a sprinkler valve or other valve that has stuck open, or substantially any fault that causes undesired water loss or excessive pump run times. For example, a long-run detection circuit 88 (FIGS. 2, 3, and 4C) may be provided to detect when a predetermined excessive amount of pump run time has been exceeded, beyond which the run time of pump 18 is considered to be excessive. An excessive run time may be as little as an hour or less, such as for water systems that do not supply water-intensive operations, or as much as two or three or four hours or more, such as for water systems that supply water-intensive operations such as commercial laundry or heavy lawn or other agriculturally related sprinkling. Thus, system status indicator 48 may indicate a fault when long-run detection circuit 88 detects one or more continuous pump run times in excess of the predetermined amount of time set at long-run circuit 88, which may include a time selector similar to time selector 58. The circuit 42 may thus be operable to record a long cycle when long-run detection circuit 88 measures the period as more than about 101% of the predetermined excessive amount of time, or more than about 125%, or 150%, etc. In the illustrated embodiment, long-run detection circuit 88 includes a binary counter 88a (FIGS. 3 and 4C) that is set to generate a signal when excessive pump run time is measured, where the counter 88a is stopped at its present value when the time that the motor signal has been on reaches the predetermined excessive amount of time.

The detection and signaling of excessive pump run times is substantially similar to the short cycle detection system and method, such that the details of detection and signaling of excessive pump run times may be understood with reference to the above description of the operation of pressure tank fault detector system 10 for detecting short cycles. It will be appreciated that the detection and signaling of excessive pump run times is not limited to systems including a pressure vessel or pressure tank, and has applications in substantially any system in which fluid is pumped in a fluid system.

It will be understood that fault detector system 10 may be used in conjunction with any pressure tank and electric pump system, and is not limited in scope to well water systems. For example, the fault detector system of the present invention may be used to detect an unacceptably large pool of condensate (i.e., water) in an air compressor tank, where the condensate occupies space in the tank that would otherwise be available for compressed air. The air compressor pump would run at less than a normal run time to bring the air tank up to a cutoff pressure because some of the compressible air is replaced by incompressible water. In such a case, a pressure tank fault detector of the present invention could be used to detect when the air tank needs to be emptied of water.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which we claim an exclusive property or privilege are defined as follows:

1. A fault detector system for a pressure tank having a pressure-actuated switch for selectively energizing a pump, said fault detector system comprising:
   a current transformer for producing a signal in response to an electrical current, said current transformer adapted to be positioned so as to be affected by the electromagnetic field of at least one electrical conductor associated with the pump; and
   an electrical circuit adapted to receive said signal from said current transformer in response to the electrical current flowing through the at least one electrical conductor, said circuit comprising a timer, a data recorder, and a system status indicator;
   wherein a normal cycle occurs when the pump is energized for at least a predetermined amount of time and a short cycle occurs when the pump is energized for a duration of less than said predetermined amount of time, said timer being operable to measure a period during which electrical current flows through the at least one electrical conductor, said data recorder being operable to record a short cycle when said timer measures the period as less than said predetermined amount of time, and wherein said system status indicator is operable to indicate a fault when said data recorder records two or more of the short cycles.

2. The fault detector system of claim 1, wherein said system status indicator is operable to indicate a fault when said data recorder records two or more consecutive short cycles.

3. The fault detector system of claim 2, further comprising a switch adapted to permit said data recorder to record only consecutive short cycles.

4. The fault detector system of claim 1, wherein said system status indicator is operable to indicate a fault when said data recorder records three or more short cycles.

5. The fault detector system of claim 4, wherein said system status indicator is operable to indicate a fault when said data recorder records four or more short cycles.

6. The fault detector system of claim 1, wherein said data recorder is operable to record a short cycle when said timer measures the period as less than about 99% of said predetermined amount of time.

7. The fault detector system of claim 6, wherein said data recorder is operable to record a short cycle when said timer measures the period as less than about 75% of said predetermined amount of time.

8. The fault detector system of claim 7, wherein said data recorder is operable to record a short cycle when said timer measures the period as less than about 50% of said predetermined amount of time.

9. The fault detector system of claim 8, wherein said data recorder is operable to record a short cycle when said timer measures the period as less than about 25% of said predetermined amount of time.

10. The fault detector system of claim 1, wherein said electrical circuit comprises a test circuit, said test circuit being operable to interrupt said signal produced by said current transformer at least two times while the electrical current is flowing through the at least one electrical conductor.

11. The fault detector system of claim 10, further comprising a visual indicator of a status of said test circuit.

12. The fault detector system of claim 1, wherein said system status indicator is operable to indicate a status of said fault detector system.

13. The fault detector system of claim 1, wherein said system status indicator is operable to indicate a status of the pump.

14. The fault detector system of claim 1, wherein said system status indicator comprises at least one chosen from (i) a light, (ii) an audible alarm, and (iii) a remote signal unit.

15. The fault detector system of claim 1, further comprising at least one selectable resistor adapted to set the quantity of short cycles recorded by said data recorder before said system status indicator indicates the fault.

16. The fault detector system of claim 1, further comprising a switch, said switch adapted to set the quantity of short cycles recorded by said data recorder before said system status indicator indicates the fault.

17. The fault detector system of claim 1, wherein said current transformer comprises a loop transformer having a passageway adapted to receive the at least one electrical conductor therethrough.

18. The fault detector system of claim 1, wherein said circuit is implemented at a printed circuit board.

19. The fault detector system of claim 1, wherein said circuit comprises a processor adapted to implement said timer, said data recorder, and said system status indicator.

20. The fault detector system of claim 1, further comprising a reset switch electrically connected to said circuit and adapted to erase data from said data recorder.

21. The fault detector system of claim 1, wherein the pressure tank comprises a well water tank.

22. The fault detector system of claim 1, wherein said system is operable without interrupting the pump.

23. The fault detector system of claim 1, further comprising a transformer rectifier adapted to supply DC power to said circuit.

24. The fault detector system of claim 23, wherein said transformer rectifier supplies between about 9 volts and about 20 volts to said circuit.

25. The fault detector system of claim 1, wherein a long cycle occurs when the pump is energized for a time period of at least a predetermined excessive amount of time, wherein said system status indicator is operable to indicate a fault when said timer measures the period as more than said predetermined excessive amount of time.

26. A method of detecting a fault in a pressure tank, said method comprising:
providing a pressure tank, a pump for pumping a fluid into said pressure tank, and a pressure-actuated switch for energizing said pump;
providing at least one electrical conductor for energizing said pump via said switch;
providing a current transformer;
providing an electrical circuit having a timer, a data recorder, and a system status indicator;
positioning said current transformer so as to be affected by the electromagnetic field of said at least one electrical conductor;
producing a signal at said current transformer in response to current flowing through said at least one electrical conductor;
measuring the duration of said signal with said timer;
recording a short cycle with said data recorder when said timer measures the duration of said signal duration as less than a predetermined amount of time;
recording the number of short cycles at said data recorder;
indicating a fault at said system status indicator when said data recorder records two or more short cycles.

27. The method of claim 26, further comprising:
indicating the fault at said system status indicator only when said data recorder records two or more consecutive short cycles.

28. The method of claim 26, further comprising:
indicating the fault at said system status indicator only when said data recorder records three or more short cycles.

29. The method of claim 28, further comprising:
indicating the fault at said system status indicator only when said data recorder records four or more short cycles.

30. The method of claim 26, further comprising:
recording a short cycle only when said timer measures said signal duration as less than about 99% of said predetermined amount of time.

31. The method of claim 30, further comprising:
recording a short cycle only when said timer measures said signal duration as less than about 75% of said predetermined amount of time.

32. The method of claim 31, further comprising:
recording a short cycle only when said timer measures said signal duration as less than about 50% of said predetermined amount of time.

33. The method of claim 32, further comprising:
recording a short cycle only when said timer measures said signal duration as less than about 25% of said predetermined amount of time.

34. The method of claim 26, further comprising:
providing a test circuit at said electrical circuit;
activating said test circuit;
creating a test fault by interrupting said signal produced by said current transformer at least one time with said test circuit while the electrical current is flowing through the at least one electrical conductor; and
detecting said test fault.

35. The method of claim 34, further comprising:
providing a visual indicator of a status of said test circuit; and
activating said visual indicator when said test circuit is activated.

36. The method of claim 26, further comprising:
indicating a status of said fault detector with said system status indicator.

37. The method of claim 26, further comprising:
indicating a status of the pump with said system status indicator.

38. The method of claim 26, wherein said indicating comprises at least one chosen from (i) sounding an audible alarm, (ii) lighting a light, and (iii) activating a remote alarm.

39. The method of claim 26, further comprising:
providing at least one selectable resistor at said electrical circuit; and
configuring said at least one selectable resistor to set the quantity of short cycles recorded by said data recorder before indicating the fault at said system status indicator.

40. The method of claim 26, further comprising:
providing a switch adapted to set the quantity of short cycles recorded by said data recorder before indicating the fault at said system status indicator; and
selecting the quantity of short cycles with said switch.

41. The method of claim 26, wherein said current transformer is a loop transformer having a passageway, said method further comprising:
inserting said at least one electrical conductor through said passageway; and
connecting said at least one electrical conductor to said pressure-actuated switch.

42. The method of claim 26, further comprising:
providing a processor at said circuit; and
controlling at least one of said timer, said data recorder, and said system status indicator with said processor.

43. The method of claim 26, further comprising:
providing a reset switch electrically connected to said circuit;
activating said reset switch; and
erasing data from said data recorder in response to said reset switch.

44. The method of claim 26, further comprising:
providing a transformer rectifier;
connecting said transformer rectifier to said electrical circuit;
connecting said transformer rectifier to one chosen from a 110 volt AC outlet and a 220 volt AC outlet; and
providing electricity to said electrical circuit via said transformer rectifier.

45. The method of claim 26, further comprising:
providing a switch adapted to permit said data recorder to record only consecutive short cycles;
activating said switch; and
recording only consecutive short cycles at said data recorder upon activation of said switch.

46. The method of claim 26, further comprising indicating a fault at said system status indicator when said timer measures the duration of said signal duration as more than a predetermined excessive amount of time.

\* \* \* \* \*

UNITED STATES PATENT AND TRADEMARK OFFICE
CERTIFICATE OF CORRECTION

PATENT NO. : 8,134,372 B2
APPLICATION NO. : 12/262788
DATED : March 13, 2012
INVENTOR(S) : Kegan Y. King et al.

It is certified that error appears in the above-identified patent and that said Letters Patent is hereby corrected as shown below:

Column 2
Line 40, "indicated" should be --indicate--

Column 3
Line 51, delete "," after "brand"

Column 4
Line 31, "Pump's" should be --pump's--
Line 37, delete "," after "is"

Column 5
Line 50, delete "," after "selector"
Line 65, "Value" should be --value--

Column 6
Line 14, "SOS" should be --SGS--

Column 7
Line 37, "example;" should be --example,--

Column 9
Line 5, delete "," after "inactive"

Signed and Sealed this
Twenty-eighth Day of May, 2013

Teresa Stanek Rea
*Acting Director of the United States Patent and Trademark Office*